United States Patent [19]

Pin et al.

[11] Patent Number: 4,472,802

[45] Date of Patent: Sep. 18, 1984

[54] SYSTEM OF TRANSMITTING INFORMATION BETWEEN A CENTRAL STATION AND SUB-STATIONS

[75] Inventors: Didier J. Pin, Mandelieu-la Napoule; Henri Badoual, Perros-Guirec, both of France

[73] Assignee: 501 Telecommunications Radioelectriques et Telephoniques T.R.T., Paris, France

[21] Appl. No.: 358,753

[22] Filed: Mar. 16, 1982

[30] Foreign Application Priority Data

Mar. 20, 1981 [FR] France ............................... 81 05633

[51] Int. Cl.³ ............................................. H04J 3/06
[52] U.S. Cl. ..................................... 370/104; 370/108
[58] Field of Search ................. 370/104, 108, 100, 95; 179/2 E, 2 EB

[56] References Cited

U.S. PATENT DOCUMENTS 3,628,147 12/1971 Makino ................................ 370/104
3,962,634 6/1976 Russo .................................. 370/108
4,010,420 3/1977 Reiner et al. ........................ 370/104

Primary Examiner—Douglas W. Olms
Assistant Examiner—Kenneth I. Rokoff
Attorney, Agent, or Firm—Thomas A. Briody; William J. Streeter

[57] ABSTRACT

The system for transmitting information between a central station (SP) and sub-stations (SS1, SS2, SS3) operates, for the transmission from the sub-stations to the central station in accordance with a method (TDMA method) which consists in providing time slots in each of which only one sub-station can transmit, the arrangement of these time slots being determined by a synchronizing signal transmitted via a link from the central station to the substations; this system is characterized in that it comprises at the sub-station ends delay adjustment means (MR1, MR2, MR3 . . . ) so as to ensure that the transmission from the sub-stations will be properly situated in the time slots assigned to them, while at the central station end it comprises means (MMR) for measuring the transmission delay between the sub-stations and the central station and in that the said link between the central station and the sub-stations has for its function to transmit, inter alia, the delay measurement information while the means (PR1, PR2, PR3) receiving the said measurement information provided in the sub-stations are used to act on the said adjusting means.

5 Claims, 5 Drawing Figures

SYSTEM OF TRANSMITTING INFORMATION BETWEEN A CENTRAL STATION AND SUB-STATIONS

The present invention relates to a system of transmitting information between a central station and sub-stations operating, for transmission in the direction from the sub-stations to the central station, in accordance with a method (TDMA method) which consists in providing time slots in each of which only one sub-station can transmit, the disposition of these time slots being determined by a synchronizing signal conveyed in a link in the direction from the main station to the sub-stations.

Transmission systems using the TDMA method (time division multiple access) are well known in the transmission technique utilizing satellites. French Patent Specification No. 2,347,836 describes such a system.

In the systems which operate in accordance with the TDMA method, the synchronization problems are of particular importance. Substations must not transmit in overlapping time slots. To solve this problem, the above-mentioned patent application describes a first measure which consists in the provision of comparatively important time margins between each time slot and a second measure which, so as to reduce these time margins somewhat, consists in calculating a time shift for the transmission of the sub-station as a function of their positions; these sub-stations, in this case aircrafts, moving along predetermined paths.

The present invention proposes a transmission system as described in the opening paragraph for which the time margins are reduced and which does not have the problem that time shifts, must be calculated.

For that purpose such a system is characterized in that it comprises, at the side of the sub-stations, delay adjustment means to ensure that the transmission from the sub-stations is properly located in the time slots assigned to them, in that it comprises at the central station end means to measure the transmission delays between the sub-stations and the central station, in that the said link from the central station to the sub-stations is arranged for transmitting inter alia information about the measured delay and in that means for receiving the said measurement provided in the sub-stations are used to act on the said adjusting means.

Thus, in accordance with the invention the time shift to be effected for the transmission from the sub-stations is no longer calculated but may be measured continuously. The time margins may then be reduced to a considerable extent.

The following description given by way of example with reference to the accompanying drawings will make it better understood how the invention can be put into effect.

Figure 1:
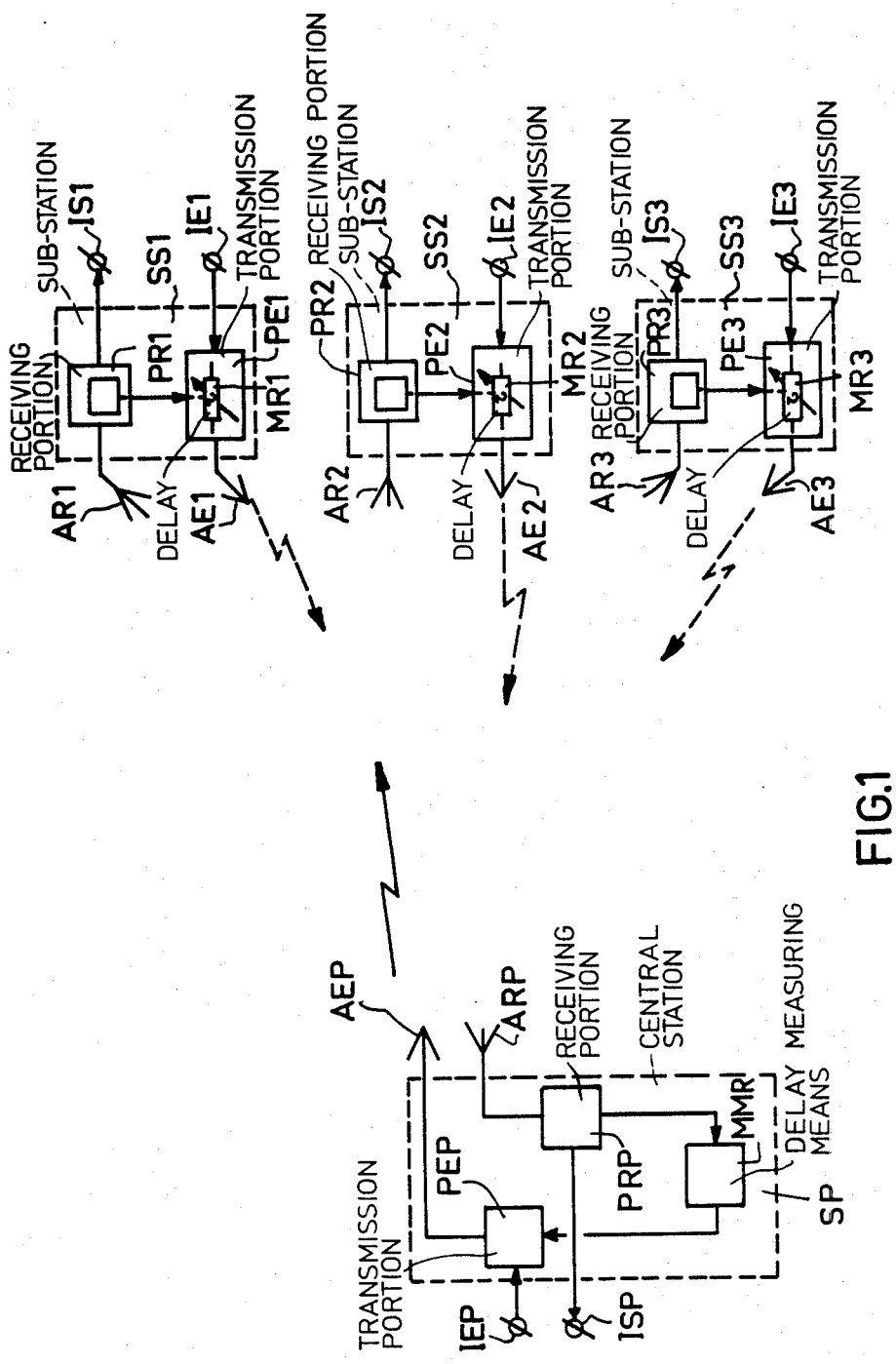
FIG. 1 shows a circuit diagram of a system in accordance with the invention.

The system shown in FIG. 1 is formed by a central station SP and sub-stations SS1, SS2, SS3 . . . The central station SP has a terminal IEP for receiving the information intended to be transmitted to the sub-stations SS1, SS2, SS3, . . . and a terminal ISP for making the information coming from these sub-stations available; these sub-stations SS1, SS2, SS3 are provided in a corresponding manner with respective terminals IE1, IE2, IE3, . . . for receiving the information intended for the central station and terminals IS1, IS2, IS3 for making the information coming from the central station available.

The station SP transmits information to the sub-stations SS1, SS2, SS3, . . . via a radio channel by means of its transmitting aerial AEP. To receive this information, the sub-stations SS1, SS2, SS3, . . . have receiving aerials AR1, AR2, AR3, . . . and to transmit information to the central station they have transmitting aerials AE1, AE2, AE3, while the central station has one aerial ARP to receive the last-mentioned information. The sub-stations SS1, SS2, SS3, . . . comprise a receiving portion PR1, PR2, PR3, . . . , respectively connected between the aerial AR2 and the terminal IS1 for the first station, between the aerial AR2 and the terminal IS2 for the second station, and between the aerial AR3 and the terminal IS3 for the third station, and comprises a transmission portion PE1, PE2 and PE3 connected between the terminal IE1 and the aerial AE1 for the first station, between the terminal IE2 and the aerial AE2 for the second station and between the terminal IE3 and the aerial AE3 for the third station. The central station SP comprises a transmission portion PEP connected between the terminal IEP and the aerial AEP and a transmission portion PRP connected between the aerial ARP and the terminal ISP.

Figure 2:
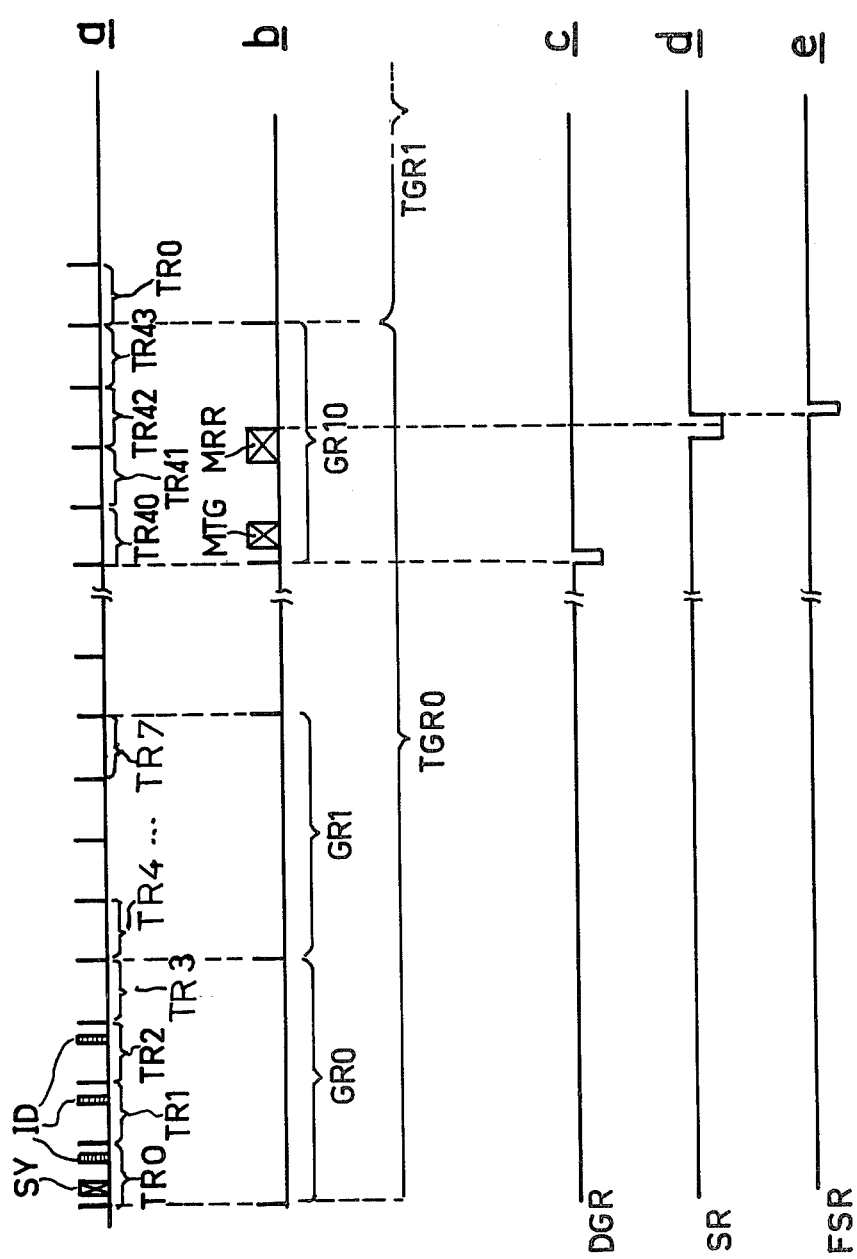
FIG. 2 is a diagram showing the organization of the links between the central station and the sub-stations on the one hand and between the sub-stations and the central station on the other hand, as well as some signals present within the measuring circuit comprised in a central station whose circuit diagram is shown in FIG. 3.

The transmission of information from the central station to the sub-stations is effected in accordance with a conventional time division multiplex method; the organization of this multiplex system is shown at line a of FIG. 2. In the described example fourty-four frames TR0, TR1, TR2, . . . TR43 are used; the organization of these frames is not shown in detail, as it is not relevant for the understanding of the invention. The assembly of these frames TR0, TR1, . . . TR43 forms a multi-frame. In this multi-frame, to identify the individual frames, a synchronization word SY is placed in a time interval in frame TR0.

The transmission of information from the sub-stations to the central station is effected in time slots GR0, GR1, . . . GR10, each slot being capable of containing a packet of 52 bytes (see line b in FIG. 2). Each of these sub-stations SS1, SS2, SS3, . . . can transmit information in one of the time slots GR0 and GR9 and in addition service (on housekeeping) information in the time slot GR10.

The time slots GR0, GR1, GR2, . . . GR10 are organized in frames TGR0, TGR1, . . . to ensure that each time slot GR10 is assigned in turn to a sub-station SS1, SS2, . . . There are sixty-four frames of this type. To identify these frames a word MTG is provided in the time slot GR10 of frame TRG0.

According to the invention the system comprises at the sub-stations SS1, SS2, SS3, . . . end means to adjust the delay MR1, MR2, MR3 to ensure that the transmission from the sub-stations will be accurately situated in the time slots assigned to them, while at the central station end it comprises means MMR for measuring the transmission delays of the sub-stations and in the multiplex link connecting the central station to the sub-stations there are time intervals ID for transmitting the delay measurement (see line a of FIG. 2), while receiving means provided in the sub-stations are used to act on the said adjusting means.

To measure this delay, each sub-station transmits in the centre of the time slot GR10 assigned to it a word MRR whose use will be further explained in the further course of this description.

Figure 3:
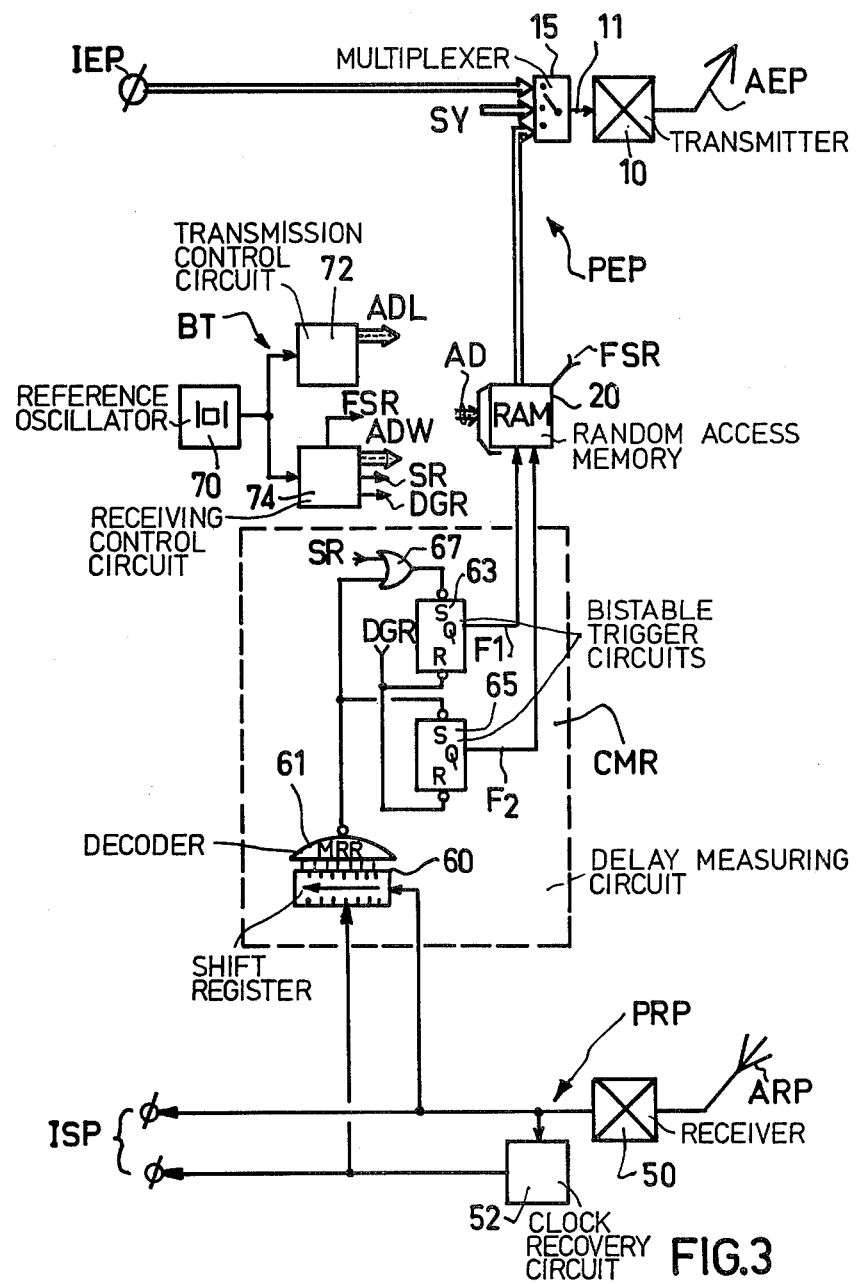
FIG. 3 shows in detail the circuit diagram of a central station in accordance with the invention.

FIG. 3 shows by way of example a circuit diagram of an embodiment of a central station which is part of a system in accordance with the invention.

The aerial AEP is connected to the output of a transmitter 10 in order that the data applied to its input 11 will be transmitted on a first carrier frequency. This input 11 is connected to the output of a multiplexer 15 having three inputs one of which is connected to the terminal IEP, whose second input permanently receives the information representing the word SY and whose third input is connected to the output of a RAM (random access memory), denoted by reference numeral 20. The inputs of this memory are connected to the outputs of a delay measuring circuit CMR which, in this example, in essence forms the delay measurement means MMR; this circuit is connected to the output of a radio receiver 50, which is connected to an aerial ARP which receives the information conveyed at a second carrier frequency of a value different from the value of the first carrier frequency. A clock recovery circuit 52 provides the rate of the data at the output of the receiver 50. The data and the rate are given on the one hand to the terminals ISP and on the other hand to the delay measurement circuit CMR.

This delay measuring circuit CMR comprises a shift register 60 whose data input is connected to the output of the receiver 50 and whose shift signal input is connected to the output of the circuit 52. A decoder circuit 61 produces an active (a "0") when the word MRR mentioned above is contained in this register 60. This circuit CMR comprises also two bistable trigger circuits of the RS type, 63 and 65. Ths input S for adjusting the bistable trigger circuit 63 to the "1" state is connected to the output of an OR gate 67, an input of which is connected to the output of the decoder 61. The output of the decoder 61 is inter alia connected to the input S of the bistable trigger circuit 65. The inputs R of the bistable trigger circuits 63 and 65 are connected to a wire DGR and the second input of the gate 67 is connected to a wire SR. The outputs Q of the bistable trigger circuits 63 and 65 are connected to the inputs of the memory 20 via the respective wires F1 and F2. These wires SR, DGR lead from a time base BT (in particular control circuit 74). This time base comprises a reference oscillator 70 which controls the transmission control circuit 72 and the receiving control circuit 74. The transmission control circuit 72 determines all the time intervals of the multiplex frame used for the transmission in the direction from the central station to the sub-stations and particularly controls the multiplexer 15 so as to ensure that the information at the terminal IEP, the synchronizing word SY and the delay information ID will be transmitted in the time interval assigned to them. At the central station the time slots GR0, GR1, . . . GR10 are expected and actually received, when the system functions properly, at the instants which are rigidly bound up with the transmitted multiplex signals in the central station-substations link. Thus, having reference to FIG. 2, the time slots GR0, GR1 are received during the transmission of the frames TR0 to TR3 for GR0, and TR4 to TR7 for GR1, the time slots GR10 are received during the transmission of the frames TR40 to TR43. Over a wire assembly ADL the transmission control circuit 72 supplies an address code to the addressing input AD of the memory 20 so as to ensure that the information IE will be written into the memory 20 and will be transmitted in adequate time intervals for reception by the relevant sub-stations. Over a wire assembly ADW the receiving control circuit 74 applies an address code to the addressing input AD of the memory 20 so as to ensure that the delay information available on the wires S1 and S2 will be registered in the memory in the address corresponding to the relevant sub-stations. Via the wire DGR the circuit 74 supplies a pulse which is shown in line c of FIG. 2 and which corresponds to the beginning of the time slot GR10. Via the wire SR it also supplies a window pulse which is shown in line d of this same FIG. 2 and whose width corresponds to the duration of a few binary elements which form the word MRR; the centre of this pulse corresponds to the end of the word MRR. Finally, via the wire FSR, the circuit 74 supplies a pulse which is shown at line e of FIG. 2. This pulse is produced at the end of the window pulse and is applied to the circuit controlling writing into the memory 20 to register the information available on the wires F1 and F2.

It is now possible to explain how the measuring circuit CMR functions.

Before the appearance of the pulse on the wire DGR, the address code on the assembly ADW corresponds to the number of one of the frames TRG0, TRG1, . . . and as a result thereof corresponds to one of the relevant sub-stations SS1, SS2, . . . by measuring the delay; the pulse which appears on the wire DGR adjusts the bistable trigger circuit 63 and 65 to the "0" state; the logic signals transmitted via the wires F1 and F2 have for each of these wires the respective logic values; "0" and "0". It is therefore sufficient to examine the following three cases.

The first case relates to the fact that the transmission from the sub-stations is adequately shifted in the time, for example with an accuracy of ±0.5 binary element; in this case the word MRR is decoded by the decoder 61 at an instant located within the window pulse of wire SR, the gate 67 which is opened by the signal from wire SR transmits the decoding signal of the decoder 61 to adjust the bistable trigger circuit 63 to the "1" state. The bistable trigger circuit 65 is also adjusted to the "1" state by this decoding signal. So the first case is characterized by logic signals having the value "1" and "1", which are transmitted via the wires F1 and F2, respectively.

The second case relates to the fact that the transmission from the sub-station is advanced in the time. The word MRR is decoded before the window pulse has been produced, which results in that the bistable trigger circuit 65 is adjusted to the "1" state and that the bistable trigger circuit 63 remains in the "0" state while the gate 67 has not been able to transmit the decoding signal to the decoder 61. So this second case is characterized by logic signals having a value "0" and "1", which are transmitted via the wires F1 and F2, respectively.

The third case relates to the fact that the transmission from the sub-stations is delayed in the time. In this last case, when the writing pulse is produced on the wire FSR, the decoding signal not having appeared, the bistable trigger circuits 63 and 65 remain in the "0" state. The logic signals on the wires F1 and F2 then have the respective values "0" and "0".

Thus, the signal on the wire F1 indicates whether the transmission from the relevant sub-station is adequately shifted or not shifted in the time, while in the case where this transmission is not adequately shifted, the signal on the wire F2 indicates whether said transmission is delayed or advanced.

Figure 4:
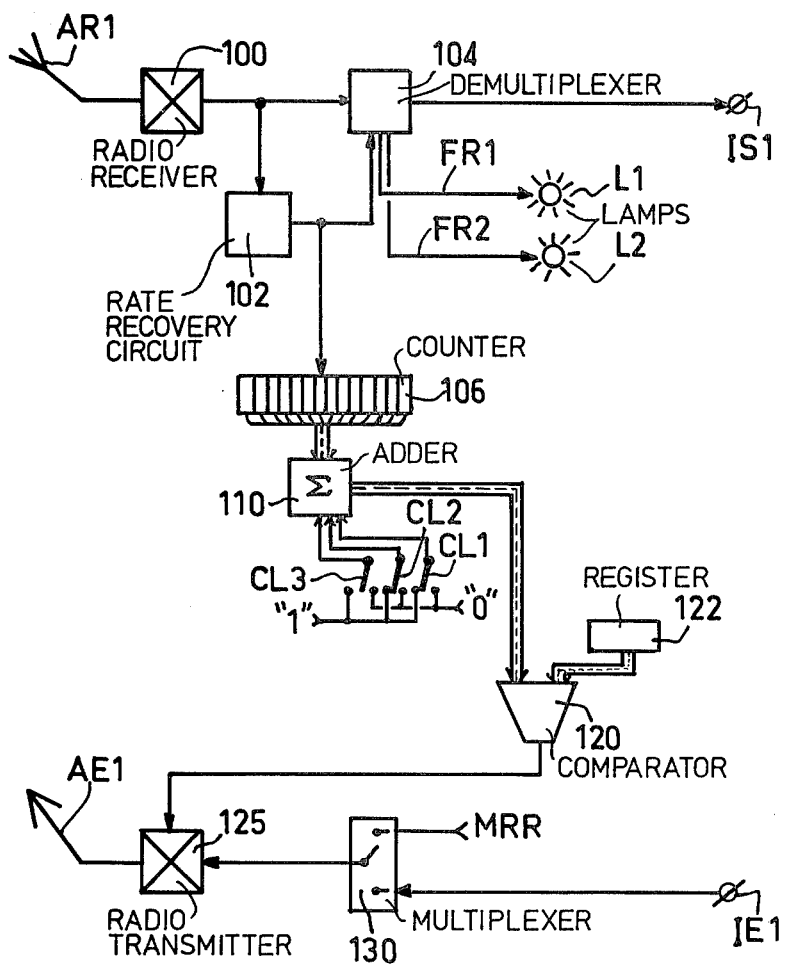
FIG. 4 shows in detail the circuit diagram of a sub-station in accordance with the invention.

FIG. 4 is a detailed representation of the portions of the sub-station SS1 which are in accordance with the invention. The other stations have identical constructions. Ths mouth of the aerial AR1 is connected to the input of a radio receiver 100 which at its output restitutes the data which were transmitted at the said first carrier frequency. A rate recovery circuit 102 applies signals to a demultiplexer 104 so as to ensure that it will supply at its terminal IS1 the proper data to the load device and at the wires FR1 and FR2 the states of the wires F1 and F2 to the central station corresponding to the relevant sub-stations. The wires FR1 and FR2 are connected to indicator lamps L1 and L2 which indicate the states of the wires FR1 and FR2. The rate recovery circuit also applies its signal to a counter 106. The outputs of this counter are connected to the inputs of an adder 110 for digital signals. The further inputs of this adder are connected to switches CL1, CL2, CL3, ... by means of which a variable binary number can be displayed, depending on the position of these switches. Thus, the number at the output of the adder varies and all this occurs as if the assembly formed by the counter 106, the adder 110 and the switches CL1, CL2, CL3, ... behaves as one single counter whose content can be shifted as a function of the position of the switches. A comparator 120 which compares the number available at the output of the adder 110 with the content of a register 122 containing the time slots (Gr0 to Gr10) in which the sub-station SS1 must transmit supplies a signal which authorizes the transmission. In this Figure, the output signal of the comparator 120 is applied to a radio transmitter 125 transmitting in accordance with the second carrier frequency, the output of this transmitter is connected to the input of the aerial AE1 while its input is connected to the output of a multiplexer 130 an input of which is connected to the terminal IE1 and whose other input permanently receives the word MRR. The control of this multiplexer is effected from the circuit 102 in accordance with customary procedures so that it is not necessary to described it here. The switches CL1, CL3, CL2 are operated by an operator who observes the lamps L1 and L2; as these lamps indicate the direction in which the shift must approximately be effected by manipulating the switches CL1, CL2, CL3, ... the operator will adjust the delay to be effected in the transmission so as to ensure that this transmission will be adequately shifted in the time.

Figure 5:
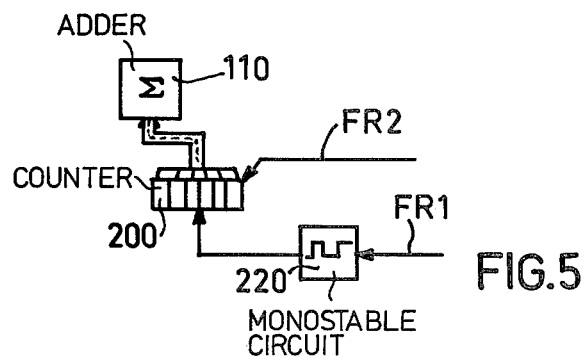
FIG. 5 shows a variant of the embodiment of a sub-station in accordance with the invention.

FIG. 5 shows a variant of an arrangement by means of which it is possible to effect this time shift automatically, instead of manually by a human operator. The switches CL1, CL2, CL3, ... are replaced by a two-way counter 200, whose input for putting the counter in the up-counting and the down-counting positions is connected to the wire FR2, while the clock input is connected to the output of a monostable circuit 220 having a period which is comparable to the total duration of the frames TRG0, TRG43, triggering of this monostable circuit being ensured by the signal present on the wire FR1 which indicates a poor frequency shift. Thus, in some steps, the sub-station is shifted in the time and the content of the two-way counter 200 is fixed as otherwise no signal would be present on the wires FR1 and FR2.

What is claimed is:

1. In a system for transmitting information between a central station and a plurality of sub-stations operating, for transmission in the direction from the sub-stations to the central station in accordance with a determined method consisting of providing time slots in each of which only one sub-station can transmit, the disposition of these time slots being determined by a synchronizing signal transmitted in a link from the central station to the sub-stations; the improvement wherein the system comprises delay adjusting means at the sub-stations to ensure that the transmission from the sub-stations will be properly situated in the time slots assigned to them, and means at the central station for measuring the transmission delays between the sub-stations and the central station, said link between the central station and the sub-stations comprising means to transmit delay measurement information while the means receiving the said measurement information in the sub-stations comprises means controlling said adjusting means.

2. A system for transmitting information in accordance with claim 1, wherein the link between the central station and the sub-stations comprises a time-division multiplex link in which time intervals are provided for transmitting the delay measurement information.

3. A transmission system as claimed in claim 1 or claim 2, wherein the sub-stations include a generator for generating a predetermined word in a given time interval in the link accomplished by said determined method, while at the central station end the means for measuring the delays are comprised of a decoding circuit for decoding said word which cooperates with a delay measuring circuit connected to determine the delay between the output signal of the decoding circuit and a locally generated signal which determines the instant of the expected appearance of the said output signal.

4. A transmission system as claimed in claim 1 or claim 2 wherein the delay adjustment means comprise manually operable switches while the receiving means comprise indicator lamps connected to indicate the direction in which the delay must be effected to correct time shift errors.

5. A transmission system as claimed in claim 1 or claim 2 wherein the receiving means are coupled to the adjusting means in order to effect the time shift automatically.

* * * * *